United States Patent [19]

Haneda et al.

[11] Patent Number: 5,439,080
[45] Date of Patent: Aug. 8, 1995

[54] PITCH-REINFORCED CARBON FIBER BRAKE DISC AND PYROLYTIC CARBON/RESIN-REINFORCED CARBON FIBER FRICTION PADS

[75] Inventors: Ichiro Haneda; Tatsuyoshi Sakurai; Mashiro Yanagisawa, all of Ueda; Kohei Okuyama, Kanagawa; Kazuo Niwa; Toshihiro Fukagawa, both of Sakaide, all of Japan

[73] Assignees: Nissin Kogyo Co., Ltd., Ueda; Mitsubishi Kasei Corp., Tokyo, both of Japan

[21] Appl. No.: 281,130

[22] Filed: Jul. 28, 1994

Related U.S. Application Data

[62] Division of Ser. No. 966,954, Oct. 27, 1992, Pat. No. 5,398,784.

[30] Foreign Application Priority Data

Oct. 29, 1991 [JP] Japan .................. 3-283257
Oct. 29, 1991 [JP] Japan .................. 3-283259
Oct. 29, 1991 [JP] Japan .................. 3-283260
Oct. 29, 1991 [JP] Japan .................. 3-283261

[51] Int. Cl.$^6$ ............................... F16D 69/00
[52] U.S. Cl. ...................... 188/218 XL; 188/251 A
[58] Field of Search ......... 188/18 A, 218 XL, 251 A, 188/264 G, 250 G, 73.2; 192/107 R, 70.14, 107 M; 264/29.1, 29.5; 423/447.7; 427/227–228; 428/408

[56] References Cited

U.S. PATENT DOCUMENTS

| | | | |
|---|---|---|---|
| 3,859,160 | 1/1975 | Marin | 428/408 X |
| 4,339,021 | 7/1982 | Kosuda et al. | 188/251 A X |
| 4,747,873 | 5/1988 | Kamioka | 428/408 X |
| 5,077,130 | 12/1991 | Okuyama et al. | 428/408 |
| 5,273,819 | 12/1993 | Jex | 428/408 X |

*Primary Examiner*—Josie A. Ballato
*Attorney, Agent, or Firm*—Armstrong, Westerman, Hattori, McLeland & Naughton

[57] ABSTRACT

A disc brake for a vehicle comprising a disc and pads, the disc being rotatable integrally with wheels and the pads capable of being brought into friction engagement with the disc. The disc comprises a baked carbon fiber reinforced carbon composite comprising dispersed bundles of short carbon fibers impregnated with a reinforcing material of primarily a pitch. The pads comprise a baked carbon fiber reinforced carbon composite comprising dispersed bundles of short carbon fibers impregnated with a reinforcing material of primarily a pyrolytic carbon and a thermosetting resin.

4 Claims, No Drawings

PITCH-REINFORCED CARBON FIBER BRAKE DISC AND PYROLYTIC CARBON/RESIN-REINFORCED CARBON FIBER FRICTION PADS

This is a division of application Ser. No. 07/966,954 filed Oct. 27, 1992 now U.S. Pat. No. 5,398,784.

BACKGROUND OF THE INVENTION AND RELATED STATEMENT

This invention relates to a disc brake for a vehicle, particularly to a disc and pads made of carbon fiber-reinforced carbon composites (hereinafter referred to as C/C composites) having excellent frictional properties.

In the disc brakes for vehicles, C/C composites are recently utilized for the disc which rotates integrally with the wheels and for the pads which are brought into frictional engagement with the disc from the standpoint of weight reduction and improvement of performance.

However, the disc and pads made of such C/C composites are susceptible to changes in the coefficient of friction depending on the temperature and cannot give a stable braking effect: the coefficient of friction is low in the low temperature range at the initial stage of braking operation but is gradually or rapidly elevated with the rise of temperature caused by the friction as the braking operation proceeds, or the low coefficient of friction remains as such.

OBJECT AND SUMMARY OF THE INVENTION

Accordingly, the present inventors made extensive studies on the brake friction members made of C/C composites to find that a stable braking effect can be obtained by using specific reinforcing materials and specific matrix materials for the disc and the pads, respectively.

A first object of the present invention is to provide a disc brake for a vehicle which can exhibit a high coefficient of friction over the low temperature to high temperature ranges and a stabilized coefficient of friction in the low temperature range, and also has excellent pad abrasion resistance.

A second object of the present invention is to provide a disc brake for a vehicle which can exhibit a high coefficient of friction over the low to high temperature ranges, a stabilized coefficient of friction in the low temperature range and excellent response at the high temperature range, and also has excellent pad abrasion resistance.

A third object of the present invention is to provide a disc brake for a vehicle which can exhibit a high coefficient of friction over the low to high temperature ranges, a stabilized coefficient of friction in the high temperature range and extremely excellent response at the low temperature range.

According to a first aspect of the present invention, the disc is prepared by impregnating a reinforcing material into a C/C composite obtained by dispersing bundles of multiple single short carbon fibers with primarily a pitch, followed by baking of the thus impregnated reinforcing material; whereas the pad is prepared by impregnating a reinforcing material into a C/C composite obtained by dispersing bundles of multiple single short carbon fibers with primarily a pyrolytic carbon and a thermosetting resin, followed by baking.

According to a second aspect of the present invention, the disc is prepared by impregnating a reinforcing material into a C/C composite obtained by dispersing bundles of multiple single short carbon fibers with primarily a pyrolytic carbon and a pitch, followed by baking; whereas the pad is prepared by impregnating a reinforcing material into a C/C composite obtained by dispersing bundles of multiple single short carbon fibers with primarily a pitch and a thermosetting resin, followed by baking.

According to a third aspect of the present invention, the disc is prepared by impregnating a reinforcing material into a C/C composite obtained by dispersing bundles of multiple single short carbon fibers with primarily a pyrolytic carbon and a pitch, followed by baking; whereas the pad is prepared by impregnating a reinforcing material into a C/C composite obtained by dispersing bundles of multiple single short carbon fibers with primarily a pyrolytic carbon and a thermosetting resin, followed by baking.

According to a fourth aspect of the present invention, the disc and the pad are both prepared by impregnating a reinforcing material into a C/C composite obtained by dispersing bundles of multiple single short carbon fibers with primarily a pyrolytic carbon and a thermosetting resin, followed by baking. However, the disc blank and the pad blank are subjected to final heat treatments at different temperatures, respectively.

As the carbon fiber to be used according to the present invention, any of known carbon fibers such as of pitch based, PAN (polyacrylonitrile) based, rayon based, etc. can be used, and inorganic fibers or inorganic substances such as SiC, $Al_2O_3$ and carbon black can, as necessary, be added thereto.

These carbon fibers may assume a form of, for example, tow, strand, roving and yarn, consisting a bundle of multiple single fibers, which is cut into a short fiber. A short fiber usually having a length of 0.3 mm to 100 mm, preferably about 5 mm to 50 mm is used in the present invention. The diameter and modulus (of elasticity) of the carbon fiber itself may not particularly be limited so long as they are within the range as can commonly be acceptable as the composite material.

A C/C composite can be obtained by subjecting such carbon fiber to fibrillation or dispersion, for example, according to the method described in Japanese Unexamined Patent Publication (KOKAI) No. 96364/1987 or 176273/1989 to provide a preform or a sheet, which is then impregnated with a matrix material and introduced into a mold, followed by pressure molding at a temperature of 100° to 500° C. to obtain a molded product having a fiber content $V_f$ of 5 to 65%, preferably 10 to 55%. Subsequently, the molded product is heated to 800° to 2,500° C. at a heating rate of 1° to 200° C./hr in an inert gas atmosphere such as $N_2$ gas and then baked at this temperature.

The desired C/C composite member can be obtained by subjecting the thus obtained C/C composite to a densification treatment and a final heat treatment for the disc or pad member.

DETAILED DESCRIPTION OF PREFERRED EMBODIMENTS

The present invention will be described below by way of preferred embodiments. It should be noted, however, that the present invention is not limited to the following embodiments, and many other modifications and variations are possible without departing from the gist of the invention.

According to a first embodiment of the present invention, a disc which is rotatable integrally with the wheels is prepared by impregnating a reinforcing material into a C/C composite obtained by dispersing bundles of multiple single short carbon fibers with primarily a pitch, followed by baking; whereas pads which are brought into friction engagement with the disc are prepared by impregnating a reinforcing material into a C/C composite obtained by dispersing bundles of multiple single short carbon fibers with a pyrolytic carbon and a thermosetting resin, followed by baking.

The disc blank for forming the disc member can be obtained by the following treatments.

The C/C composite is set in a vessel heated to a predetermined temperature, and after evacuation of the vessel, a melt pitch is supplied thereto to impregnate the voids of the C/C composite formed by baking with the matrix material. Subsequently, the thus treated C/C composite is baked again at a temperature of 800° to 2,500° C. The C/C composite is densified by repeating the above procedures. If necessary, a final heat treatment is applied at a temperature of 2,500° C. or lower to obtain a desired C/C composite for the disc blank.

Meanwhile, the pad blank for forming the pad member can be obtained by the following treatments.

The C/C composite set in a chamber is heated by an induction heating coil and the like, and a stream of hydrocarbon or halogenated hydrocarbon is supplied thereto together with a hydrogen gas, argon gas or nitrogen gas to infiltrate the voids of the C/C composite with the pyrolytic carbon thus formed to effect densification of the C/C composite. The thus treated C/C composite is set in a vessel heated to a predetermined temperature, and after evacuation of the vessel, a thermosetting resin, preferably a phenol resin, is supplied thereto to impregnate the voids of the C/C composite with the matrix material. Subsequently, the thus treated C/C composite is baked at a temperature of 800° to 2,500° C. The C/C composite is densified by repeating the above procedures. If necessary, a final heat treatment is applied at a temperature of 2,500° C. or lower to obtain a desired C/C composite for the pad blank.

Next, preparation of the disc and pad will be described by way of Preparation Examples.

PREPARATION EXAMPLE 1

A pitch based carbon fiber of filament number 4,000 cut into 30 mm long pieces were dispersed to obtain a sheet orientated at random into two dimensions. The thus obtained sheet was impregnated with a phenol resin and dried to provide an impregnated sheet comprising 65 parts of the phenol resin impregnated per 100 parts of the carbon fiber. Some of such sheets were laminated in a mold and subjected to pressure molding at 250° C. to obtain a molded product having a $V_f$ value of about 50%. The molded product was baked in a furnace to a temperature of 2,000° C.

Subsequently, the baked product was impregnated with a pitch and baked in a furnace at a temperature of 1,000° C. After the pitch impregnation and baking procedures were repeated analogously, the product was further subjected to a final heat treatment at 2,000° C. to obtain a C/C composite for the disc blank having a porosity of 8%.

PREPARATION EXAMPLE 2

A pitch based carbon fiber of filament number 4,000 cut into 10 mm long pieces were subjected to wet dispersion and introduced together with water to an annular mold having an outer cylinder diameter of 300 mm and an inner cylinder diameter of 120 mm equipped with a 150 mesh screen at the bottom and an outer bottom plate. After the dispersed carbon fiber was stirred homogeneously, the bottom plate was released to remove the solution entirely from the bottom and obtain an annular perform comprising a uniform dispersion of the carbon fiber.

After drying, the preform was impregnated with a phenol resin and dried to provide a prepreg. The prepreg was then set in a mold having the same outer diameter and inner diameter as those of the above mold and subjected to molding at a temperature of 250° C. to obtain a molded product having a $V_f$ value of 50%. The thus molded product was baked to a temperature of 2,000° C. and then heated in a high-frequency induction heater with a hydrocarbon steam being introduced thereto using a nitrogen gas as a carrier gas to infiltrate the voids of the molded product with the pyrolytic carbon thus formed, whereby to effect densification.

Subsequently, the thus densified product was impregnated with a phenol resin and then baked in a furnace at 1,000° C. After the phenol resin impregnation and baking procedures were repeated again analogously, the product was further subjected to a final heat treatment at 2,000° C. to obtain a C/C composite for the pad blank having a porosity of 16%.

The thus obtained disc blank and pad blank were subjected to a bench test according to JIS D4411 to find that the coefficients of friction in the low temperature range of lower than 100° C. and the high temperature range of 100° to 450° C. were as high as $\mu=0.5$ to 0.55 and $\mu=0.45$ to 0.5, respectively. The variation in the coefficient of friction in the low temperature range was $\mu=0.05$ to 0.1, while that in the high temperature range was $\mu=0.1$ or less. Further, the wear of the pad was 0.1 mm or less.

COMPARATIVE EXAMPLE 1

A C/C composite obtained by using a CVD carbon matrix was used as the disc blank and the pad blank to carry out the same test as described above to find that the coefficients of friction in the low temperature range of lower than 100° C. and the high temperature range of 100° to 450° C. were $\mu=0.33$ to 0.35 and $\mu=0.35$ to 0.4, respectively. The variation in the coefficient of friction in the low temperature range was $\mu=0.10$ to 0.15, while that in the high temperature range was $\mu=0.05$ to 0.1. Further, the wear was 0.2 to 0.3 mm.

According to the first embodiment, there is provided a disc brake for a vehicle which can exhibit a high coefficient of friction over the low to high temperature ranges and a stabilized coefficient of friction at the low temperature ranges and also has excellent pad abrasion resistance.

According to a second embodiment of the present invention, a disc which is rotatable integrally with the wheels is prepared by impregnating a reinforcing material into a C/C composite obtained by dispersing bundles of multiple single short carbon fibers with primarily a pyrolytic carbon and a pitch, followed by baking; whereas pads which are brought into friction engagement with the disc are prepared by impregnating a reinforcing material into a C/C composite obtained by dispersing bundles of multiple single short carbon fibers with primarily a pitch and a thermosetting resin, followed by baking.

The disc blanks for forming the disc member can be obtained by the following treatments.

The C/C composite set in a chamber is heated by an induction heating coil and the like, and a steam of hydrocarbon or halogenated hydrocarbon is supplied thereto together with a hydrogen gas, argon gas or nitrogen gas to infiltrate the voids of the C/C composite with the pyrolytic carbon thus formed to effect densification thereof. The thus treated C/C composite is then set in a vessel heated to a predetermined temperature, and after evacuation of the vessel, a melt pitch is supplied thereto to impregnate the voids of the C/C composite formed by the baking with the matrix material. Subsequently, the thus treated composite is baked at a temperature of 800° to 2,500° C. The C/C composite is densified by repeating the above procedures. If necessary, a final heat treatment is applied at a temperature of 2,500° C. or lower to obtain a desired C/C composite for the disc blank.

Meanwhile, the pad blank for forming the pad member can be obtained by the following treatments.

The C/C composite is set in a vessel heated to a predetermined temperature, and after evacuation of the vessel, a melt pitch and a thermosetting resin, preferably a phenol resin, are successively supplied thereto to impregnate the voids of the C/C composite formed by baking with the matrix material. Subsequently, the thus treated C/C composite is baked again at a temperature of 800° to 2,500° C. The C/C composite is densified by repeating the above procedures. If necessary, a final heat treatment is applied at a temperature of 2,500° C. or lower to obtain a desired C/C composite for the pad blank.

Next, preparation of the disc and pad will be described by way of Preparation Examples.

PREPARATION EXAMPLE 3

A pitch based carbon fiber of filament number 4,000 cut into 30 mm long pieces were dispersed to obtain a sheet orientated at random into two dimensions. The thus obtained sheet was impregnated with a phenol resin and dried to provide an impregnated sheet comprising 65 parts of the phenol resin impregnated per 100 parts of the carbon fiber. Some of such sheets were laminated in a mold and subjected to pressure molding at 250° C. to obtain a molded product having a $V_f$ value of about 50%. After the molded product was baked in a furnace to a temperature of 2,000° C., the thus baked product was heated in a high-frequency induction heater with a hydrocarbon steam being introduced thereto using a nitrogen gas as a carrier gas to infiltrate the voids of the product with the pyrolytic carbon thus formed, whereby to effect densification.

Subsequently, the thus densified product was impregnated with a pitch and then baked in a furnace at 1,000° C. After the pitch impregnation and baking procedures were repeated again analogously, the product was further subjected to a final heat treatment at 2,000° C. to obtain a C/C composite for the disc blank having a porosity of 11%.

PREPARATION EXAMPLE 4

A pitch based carbon fiber of filament number 4,000 cut into 30 mm long pieces were dispersed to obtain a sheet orientated at random into two dimensions. The thus obtained sheet was impregnated with a phenol resin and dried to provide an impregnated sheet comprising 65 parts of the phenol resin impregnated per 100 parts of the carbon fiber. Some of such sheets were laminated in a mold and subjected to pressure molding at 250° C. to obtain a molded product having a $V_f$ value of about 50%. After the molded product was baked in a furnace to a temperature of 2,000° C., the thus baked product was impregnated with a pitch and baked in a furnace at a temperature of 1,000° C. Subsequently, the thus treated product was impregnated with a phenol resin and heated in a furnace to a temperature of 1,000° C.

After the phenol resin impregnation and baking procedures were repeated again analogously, the product was further subjected to a final heat treatment at 2,000° C. to obtain a C/C composite for the pad blank having a porosity of 14%.

The thus obtained disc blank and pad blank were subjected to a bench test according to JIS D4411 to find that the coefficients of friction in the low temperature range of lower than 100° C. and the high temperature range of 100° to 450° C. were as high as $\mu=0.4$ to 0.5 and $\mu=0.4$ to 0.45, respectively. The variation in the coefficient of friction in the low temperature range was $\mu=0.05$ to 0.1, while that in the high temperature range was $\mu=0.2$ or less. Further, the wear of the pad was 0.1 to 0.2 mm.

According to the second embodiment of the present invention, there is provided a disc brake for a vehicle having the similar characteristics to the one obtained in the first embodiment.

According to a third embodiment of the present invention, a disc which is rotatable integrally with the wheels is prepared by impregnating a reinforcing material into a C/C composite obtained by dispersing bundles of multiple single short carbon fibers with primarily a pyrolytic carbon and a pitch, followed by baking; whereas pads which are brought into frictional engagement with the disc are prepared by impregnating a reinforcing material into a C/C composite obtained by dispersing bundles of multiple single short carbon fibers with primarily a pyrolytic carbon and a thermosetting resin, followed by baking.

The disc blank for forming the disc member can be obtained using the same treatments as in the second embodiment and can be prepared in the same manner as in Preparation Example 3.

The pad blank used for the pad member can be obtained using the same treatments as in the first embodiment and can be prepared in the same manner as in Preparation Example 2.

The thus obtained disc blank and pad blank were subjected to a bench test according to JIS D4411 to find that the coefficients of friction in the low temperature range of lower than 100° C. and the high temperature range of 100° to 450° C. were as high as $\mu=0.5$ to 0.6 and $\mu=0.45$ to 0.5, respectively. The variation in the coefficient of friction in the low temperature range was $\mu=0.05$ to 0.1, while that in the high temperature range was $\mu=0.05$ to 0.1. The wear of the pad was 0.1 to 0.2 mm. Further, the response at high temperatures was extremely excellent.

According to the third embodiment, there is provided a disc brake for a vehicle which can exhibit a high coefficient of friction over the low to high temperature ranges, a stabilized coefficient of friction in the low temperature range and excellent response in the high temperature range, and also has excellent pad abrasion resistance.

According to a fourth embodiment of the present invention, a disc which is rotatable integrally with the wheels and pads are both prepared by impregnating reinforcing materials into a C/C composite obtained by dispersing bundles of a single short carbon fiber with primarily a pyrolytic carbon and a thermosetting resin, followed by baking, wherein the C/C composite material for the disc and that for the pads are subjected to final heat treatments at different temperatures, respectively.

The disc blank for forming the disc member can be obtained by the following treatments.

The C/C composite set in a chamber is heated by an induction heating coil and the like, and a steam of hydrocarbon or halogenated hydrocarbon is supplied thereto together with a hydrogen gas, argon gas or nitrogen gas to infiltrate the voids of the C/C composite with the pyrolytic carbon thus formed to effect densification thereof. The thus treated C/C composite is then set in a vessel heated to a predetermined temperature, and after evacuation of the vessel, a thermosetting resin, preferably a phenol resin, is supplied thereto to impregnate the voids of the C/C composite with the matrix material. Subsequently, the thus treated C/C composite is baked at a temperature of 800° to 1,000° C. to effect carbonization of the matrix thermosetting resin. The C/C composite is densified by repeating the above resin impregnation procedure. A final heat treatment is applied at a temperature of 1,500° to 2,000° C., preferably 1,800° C. or lower to obtain a desired C/C composite for the disc blank.

The temperature of this final heat treatment is set to a temperature usually different, preferably lower, by at least 100° C. from the final heat treatment temperature applied to the pad.

Meanwhile, the pad blank for forming the pad member can be obtained by the following treatments.

The C/C composite set in a chamber is heated by an induction coil heater and the like, and a steam of hydrocarbon or halogenated hydrocarbon is supplied thereto together with a $H_2$ gas, Ar gas or $N_2$ gas to infiltrate the voids of the C/C composite with the pyrolytic carbon thus formed to effect densification thereof. The thus treated C/C composite is then set in a vessel heated to a predetermined temperature, and after evacuation of the vessel, a thermosetting resin, preferably a phenol resin, is supplied thereto to impregnate the voids of the C/C composite with the matrix material. Subsequently, the thus treated C/C composite is baked at a temperature of 800° to 2,500° C. The C/C composite is densified by repeating the above resin impregnation procedure. A final heat treatment is applied at a temperature of 2,500° C. or lower to obtain a desired C/C composite for the pad blank.

Next, preparation of the disc will be described by way of Preparation Example.

PREPARATION EXAMPLE 5

A pitch based carbon fiber of filament number 4,000 cut into 100 mm long pieces were subjected to wet dispersion and introduced together with water to an annular mold having an outer cylinder diameter of 300 mm and an inner cylinder diameter of 120 mm equipped with a 150 mesh screen at the bottom and an outer bottom plate. After the dispersed carbon fiber was stirred homogeneously, the bottom plate was released to remove the solution entirely from the bottom and obtain an annular preform comprising a uniform dispersion of the carbon fiber.

After drying, the preform was impregnated with a phenol resin and dried to provide a prepreg. The prepreg was then set in the mold having the same outer diameter and inner diameter as those of the above mold and subjected to molding at a temperature of 250° C. to obtain a molded product having a $V_f$ value of 50%. The thus molded product was baked in furnace to a temperature of 2,000° C. and then heated in a high-frequency induction heater with a hydrocarbon steam being introduced thereto using a nitrogen gas as a carrier gas to infiltrate the voids thereof with the pyrolytic carbon thus formed, whereby to effect densification.

Subsequently, the thus densified product was impregnated with a phenol resin and then baked in a furnace at 1,000° C. After the phenol resin impregnation and baking procedures were repeated again analogously, the product was further subjected to a final heat treatment at 1,700° C. to obtain a C/C composite for the disc blank having a porosity of 13%.

A pad was prepared in the same manner as in Preparation Example 2.

The thus obtained disc blank and pad blank were subjected to a bench test according to JIS D4411 to find that the coefficients of friction in the low temperature range of lower than 100° C. and the high temperature range of 100° to 450° C. were both as high as $\mu = 0.45$ to 0.5. The variation in the coefficient of friction in the low temperature range was $\mu = 0.15$ to 0.2, while that in the high temperature range was $\mu = 0.01$ to 0.05, respectively. Further, the response in the low temperature range was extremely excellent.

COMPARATIVE EXAMPLE 2

A C/C composite obtained by using a CVD carbon matrix was used as the disc blank and the pad blank to carry out the same test as described above to find that the coefficients of friction in the low temperature range of lower than 100° C. and the high temperature range of 100° C. to 450° C. were $\mu 0.33$ to 0.35 and $\mu = 0.35$ to 0.4, respectively. The variation in the coefficient of friction in the low temperature range was $\mu = 0.1$ to 0.15, while that in the high temperature range was $\mu = 0.05$ to 0.1. Further, the response in the low temperature range was good.

According to the fourth embodiment of the present invention, there is provided a disc brake for a vehicle which can exhibit a high coefficient of friction over the low to high temperature ranges, a stabilized coefficient of friction at the high temperature range and extremely excellent response in the low temperature range.

What is claimed is:

1. A disc brake for a vehicle comprising a disc and pads, said disc being rotatable integrally with wheels and the pads which are brought into friction engagement with said disc;
    wherein said disc comprises a baked carbon fiber reinforced carbon composite comprising dispersed bundles of short carbon fibers impregnated with a reinforcing material of primarily a pitch, said pads comprising a baked carbon fiber reinforced carbon composite comprising dispersed bundles of short carbon fibers impregnated with a reinforcing material of primarily a pyroltic carbon and a thermosetting resin.

2. The disc brake for a vehicle according to claim 1, wherein said carbon fibers are a pitch based, polyacrylonitrile based or rayon based carbon fibers.

3. The disc brake for a vehicle according to claim 1, wherein said carbon fibers have a length of 0.3 to 100 mm.

4. The disc brake for a vehicle according to claim 1, wherein said thermosetting resin is a phenol resin.

* * * * *

UNITED STATES PATENT AND TRADEMARK OFFICE
CERTIFICATE OF CORRECTION

PATENT NO.:    5,439,080
DATED     :    August 8, 1995
INVENTOR(S):   HANEDA et al.

It is certified that error appears in the above-identified patent and that said Letters Patent is hereby corrected as shown below:

On the cover page, Item [75], the third inventor's first name "Mashiro" shoud read --Masahiro--.

Signed and Sealed this

Sixteenth Day of April, 1996

Attest:

BRUCE LEHMAN

Attesting Officer

Commissioner of Patents and Trademarks